United States Patent [19]
Tsu et al.

[11] Patent Number: 5,810,450
[45] Date of Patent: Sep. 22, 1998

[54] WHEEL ASSEMBLY WITH LIGHTING CIRCUIT

[76] Inventors: Ming Chiao Tsu, No. 18, Sec. 3, Cherng Der Rd., Taipei; Wen I. Huang, 5F-9, No. 5, Wu Chyuan 1 Rd., Hsin Chuang, Taipei Hsien, both of Taiwan

[21] Appl. No.: 825,669

[22] Filed: Apr. 3, 1997

[51] Int. Cl.⁶ ................................................. A63C 17/26
[52] U.S. Cl. ............................................. 301/5.3; 362/78
[58] Field of Search .......................... 301/5.3, 5.7, 64.7; 280/11.19, 11.22, 11.23; 362/78, 103, 192

[56] References Cited

U.S. PATENT DOCUMENTS

| | | | |
|---|---|---|---|
| 4,298,910 | 11/1981 | Price | 301/5.7 X |
| 5,536,074 | 7/1996 | Hsu et al. | 301/5.3 |
| 5,552,972 | 9/1996 | Rezvani | 362/78 |
| 5,580,093 | 12/1996 | Conway | 301/5.3 X |
| 5,649,716 | 7/1997 | Zhang | 301/5.3 X |

*Primary Examiner*—Russell D. Stormer
*Attorney, Agent, or Firm*—Pro-Techtor International Services

[57] ABSTRACT

A wheel assembly including a magnetic core fixedly mounted on a wheel axle within a wheel, a winding wound round a reel around the magnetic core and turned with the wheel about the magnetic core, two induction ring caps mounted on two opposite ends of the reel and induced to produce electric energy upon rotation of the wheel, wherein the two induction ring caps have each four induction legs equiangularly and radially spaced around the border, the four induction legs of the two induction ring caps being disposed in parallel and arranged in a staggered manner; four light emitting diodes are respectively and electrically connected between the induction legs of the two induction ring caps and received in respective recessed holes in the wheel, and driven by electric energy induced from the induction ring caps to produce light.

1 Claim, 6 Drawing Sheets

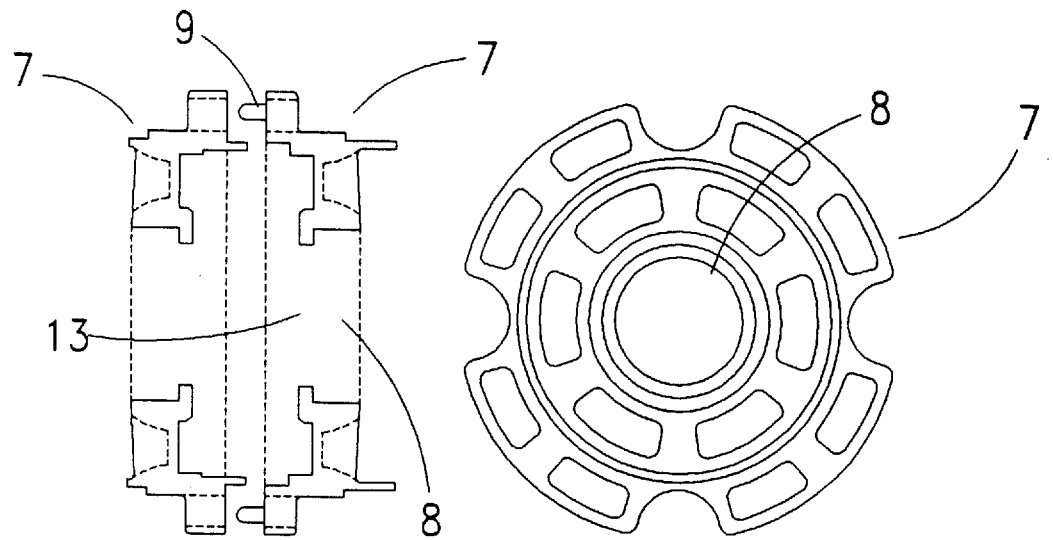
Fig.6A   Fig.6B
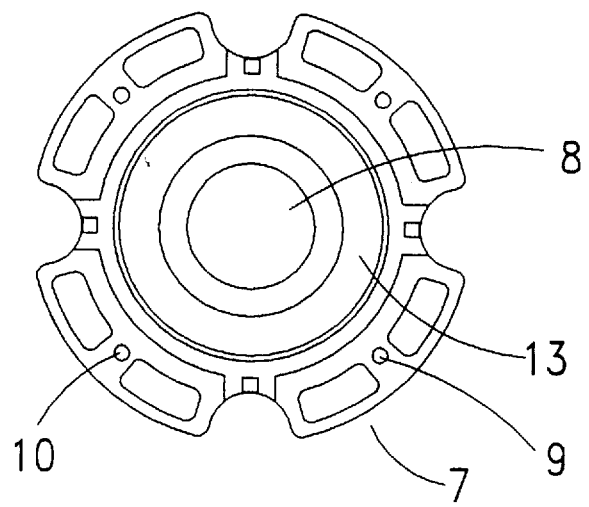
Fig. 7

WHEEL ASSEMBLY WITH LIGHTING CIRCUIT

BACKGROUND OF THE INVENTION

The present invention relates to a wheel assembly which is mounted with a power generating circuit, that provides electric energy to turn on LEDs alternatively by means of magnetic induction upon rotary motion of the wheel.

A variety of wheels with lighting circuit means for roller skates, skateboards, etc., have been disclosed. A lighting circuit for this purpose generally comprises a plurality of LEDs (light emitting diodes), a flashing circuit, a vibration switch, and a battery. The battery and the flashing circuit form with the vibration switch a series loop. The LEDs are connected to the output end of the flashing circuit. When the wheel is rotated, the vibration switch is closed, thereby causing the flashing circuit to flash the LEDs. The flashing of the LEDs attracts people's attention, and is acted as a warning signal. However, a lighting circuit of this design still has drawbacks. Because the lighting circuit uses a vibration switch to control the connection of battery power supply, battery power supply tends to be wasted when the vibration switch is vibrated during the delivery of the equipment. Another drawback of this lighting circuit is the complicated procedure of replacing the battery because the battery is mounted inside the wheel. Furthermore, the flashing circuit, the battery and the LEDs must be firmly secured in place by securing means, or the circuit and parts of the circuit may be damaged when the wheel receives a heavy impact force.

SUMMARY OF THE INVENTION

The present invention has been accomplished to provide a lighting circuit for a wheel which eliminates the aforesaid drawbacks. According to one aspect of the present invention, a magnetic induction type power generating structure is provided and installed in the wheel to induce electric energy for turning light emitting diodes. According to another aspect of the present invention, the magnetic induction type power generating structure form a part of the wheel axle, and therefore it resists against heavy impact force.

BRIEF DESCRIPTION OF THE DRAWINGS

FIG. 6 are front view of one wheel half and sectional views of the two wheel halves according to the present invention;

FIG. 7 is a back view of one wheel half according to the present invention; and

DETAILED DESCRIPTION OF THE PREFERRED EMBODIMENT

Figure 2:
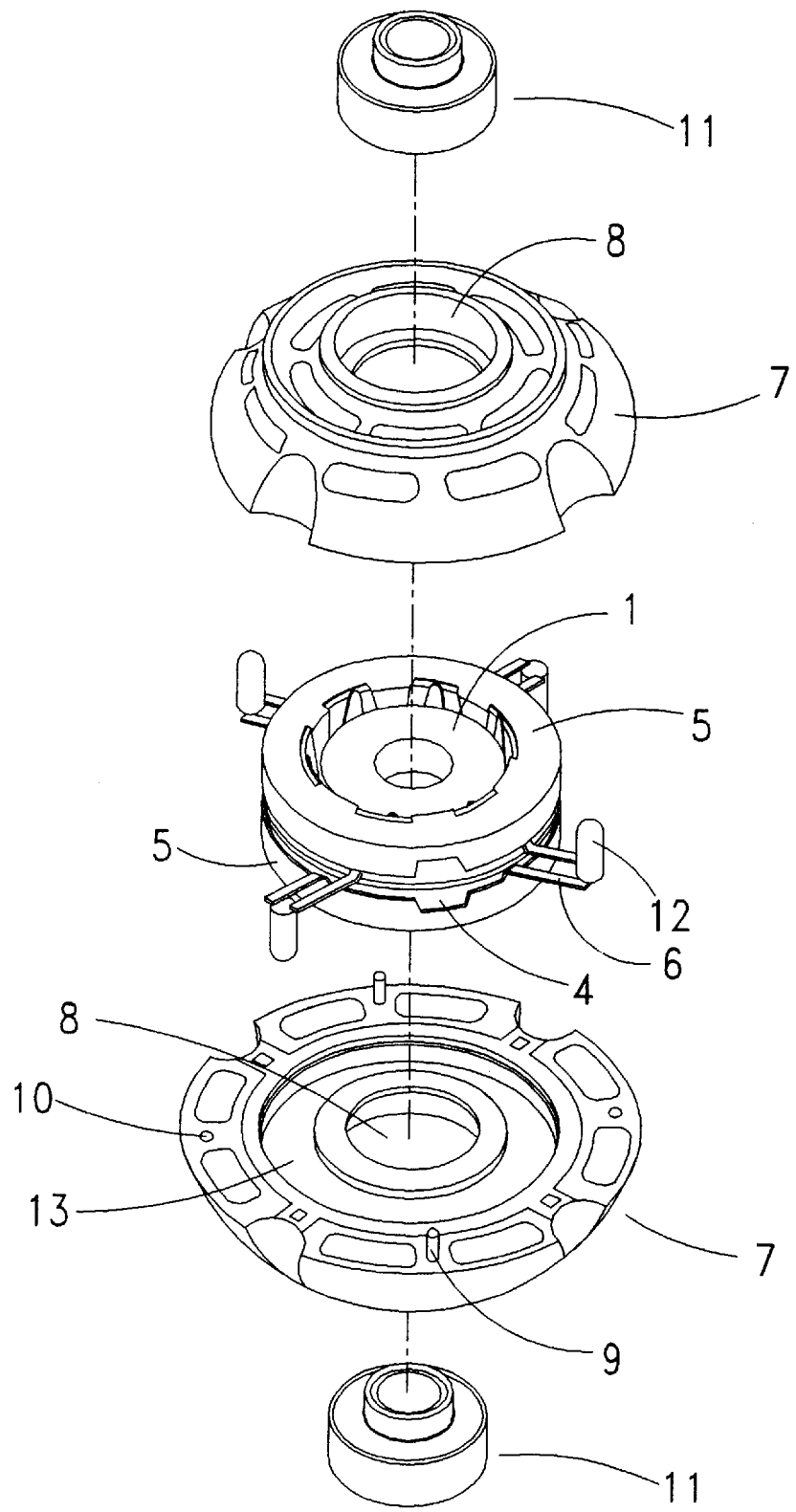
FIG. 2 is similar to FIG. 1 but showing the reel, the winding, the metal strip, the annular magnetic core, the induction ring caps and the light emitting diodes assembled.

Referring to Figures from 1 to 7, the present invention comprises a reel 2, a winding 3 is wound round a reel 2, an electrically conductive metal strip 4 covered over the winding 3 and connected with two terminals of the winding 3, two induction ring caps 5 respectively covered on two opposite ends of the reel 2 (see FIG. 2), an annular magnetic core 1 mounted within the reel 2 in between the induction ring caps 5, and two symmetrical wheel halves 7 fastened together to hold the assembly of the induction ring caps 5, the reel 2, the winding 3 and the metal strip 4 on the inside. The symmetrical wheel halves 7 are fastened together by fitting respective pins 9 into respective pin holes 10, and then sealed by a high-frequency heat sealing apparatus. Each wheel half 7 comprises a wheel hub 8 at the center, and a recessed portion 13 around the wheel hub 8 which receives one induction ring cap 5. The sectional, top and bottom views of the wheel halves 7 are shown in FIGS. 6 and 7.

Figure 1:
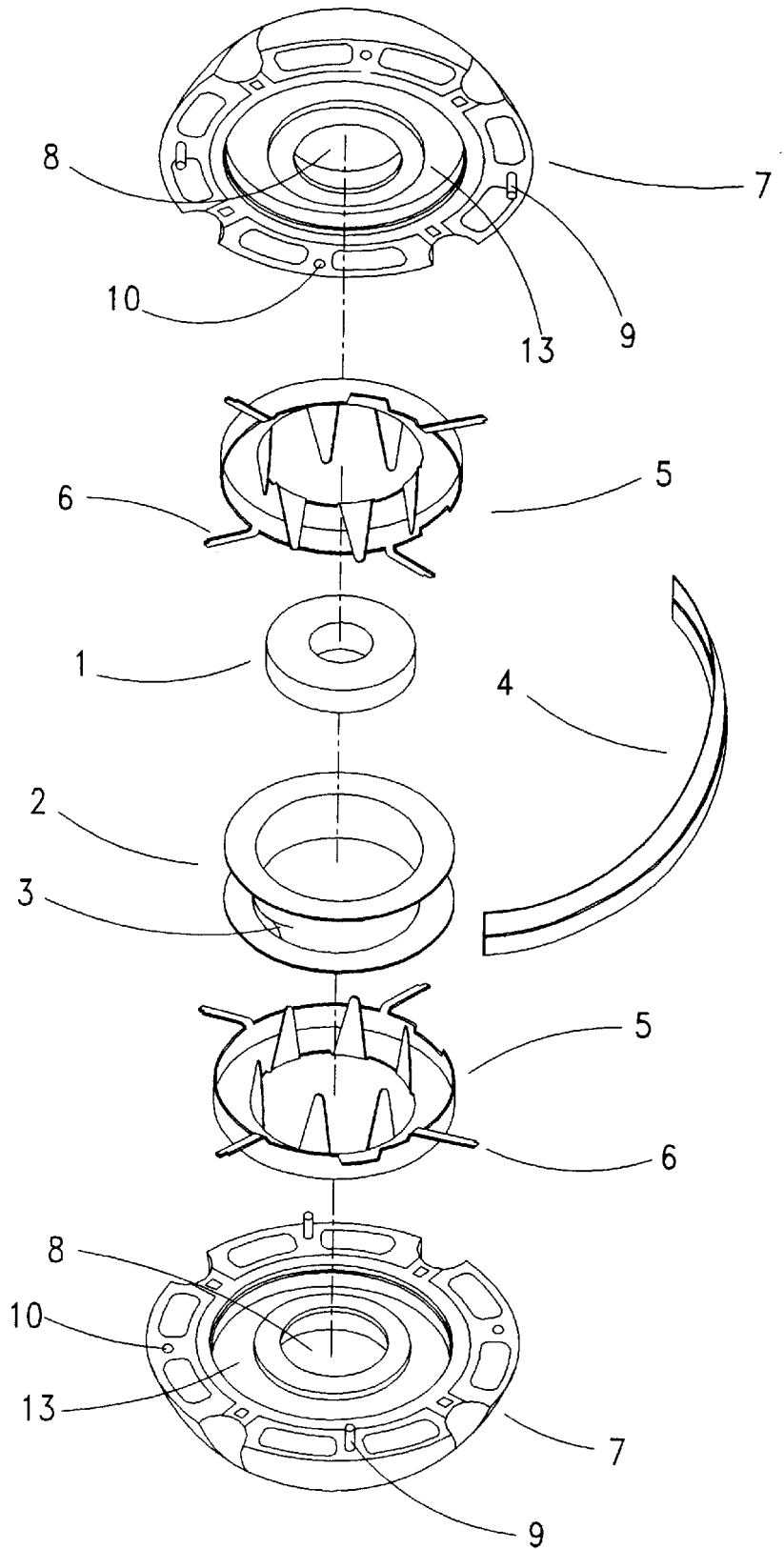
FIG. 1 is an exploded view of the present invention.
Figure 4:
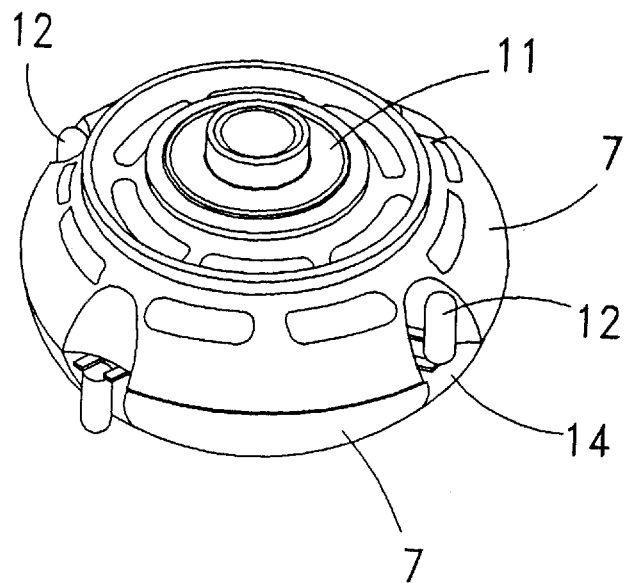
FIG. 4 is an elevational assembly view of the present invention.
Figure 8:
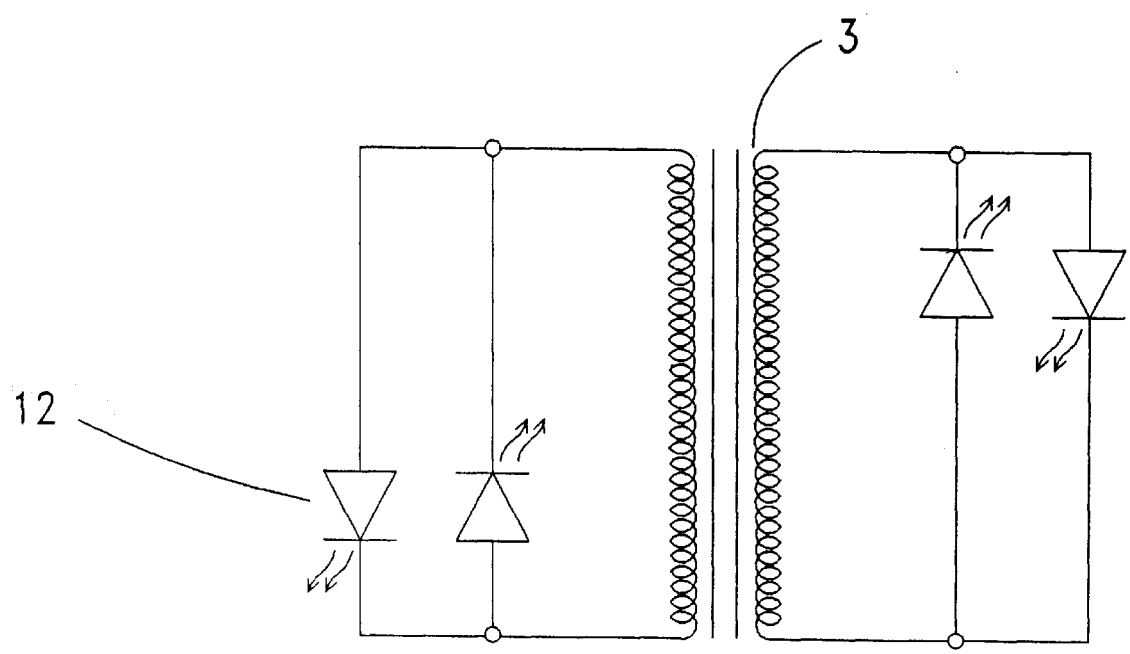
FIG. 8 is a circuit diagram of the present invention.

Referring to FIGS. 1 and 2 again, the induction ring caps 5 have each four outward induction legs 6 equiangularly and radially spaced around the border. When the two induction ring caps 5 are fastened to the reel 2, the outward induction legs 6 of the two induction ring caps 5 are arranged in parallel but not vertically aligned, and four light emitting diodes 12 are respectively and electrically connected between the outward induction legs 6 of the two induction ring caps 5 and suspended in respective recessed holes 14 in the wheel halves 7 (see FIG. 4). FIG. 8 shows the circuit diagram of the light emitting diodes 12 and the winding 3.

Figure 3:
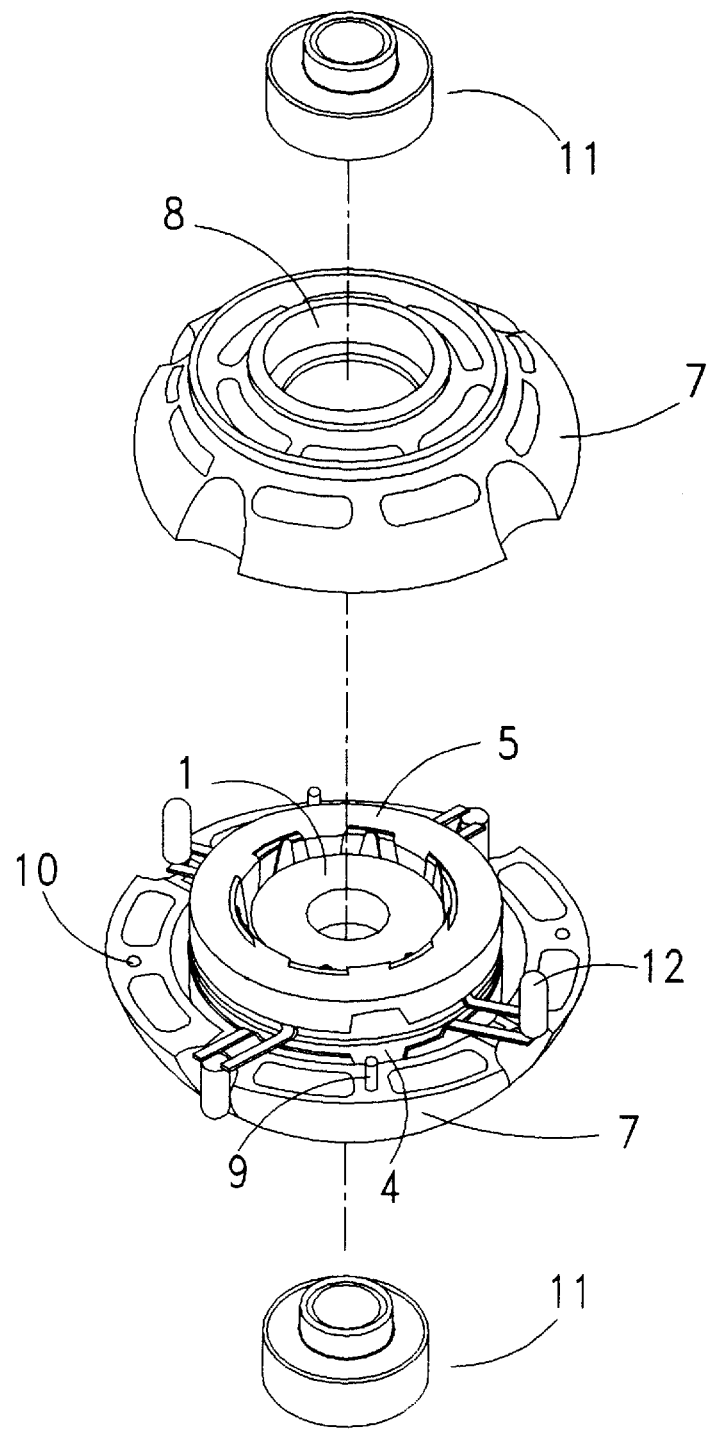
FIG. 3 is similar to FIG. 2 but showing one induction ring cap mounted in one wheel half.
Figure 5:
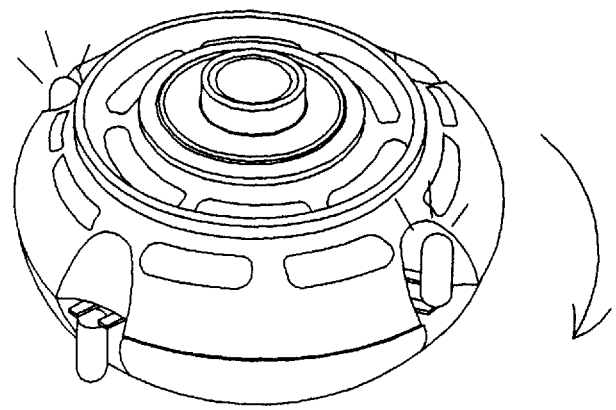
FIG. 5 is similar to FIG. 4 but showing the wheel turned.

Referring to FIGS. 3 and 4 again, two axle bearings 11 are respectively and fixedly mounted in the wheel hubs 8 of the two wheel halves 7 to hold down the annular magnetic core 1 in therebetween inside the wheel halves 7. When the axle bearings 11 are installed, they are axially aligned with the annular magnetic core 1, and a wheel axle (not shown) can then be inserted through the axle bearings 11 and the annular magnetic core 1. When the wheel which is formed of the wheel halves 7 is rotated, the induction ring caps 5 are turned with the wheel about the annular magnetic core 1, thereby causing S, N poles of the annular magnetic core 1 to act with the winding 3, and therefore the induction ring caps 5 are induced to provide electric energy to the light emitting diodes 12. When the induction ring caps 5 are induced to provide electric energy to the light emitting diodes 12, the light emitting diodes 12 are alternatively turned on and off in pair (see FIG. 5, and the circuit diagram of FIG. 8).

While only one embodiment of the present invention has been shown and described, it will be understood that various modifications and changes could be made thereunto without departing from the spirit and scope of the invention disclosed.

What the invention claimed is:

1. A wheel assembly comprising a wheel having two symmetrical wheel halves fastened together and turned about a wheel axle; a reel mounted in between the two wheel halves of said wheel and turned with said wheel; a winding wound around said reel and having two opposite lead ends respectively connected to a metal strip covered thereon; two induction ring caps mounted on two opposite ends of said reel; and an annular magnetic core fixedly mounted on said wheel axle to act with said winding when said reel is turned with said wheel about said wheel axle, causing said induction ring cap to induce electric energy; wherein said two induction ring caps have each four induction legs equiangularly and radially spaced around the border, the four induction legs of said two induction ring caps being disposed in parallel and arranged in a staggered manner; four light emitting diodes are respectively and electrically connected between the induction legs of said two induction ring caps and received in respective recessed holes in said wheel, and driven by electric energy induced from said induction ring caps to produce light.

* * * * *